United States Patent
Yu et al.

(10) Patent No.: US 8,230,162 B2
(45) Date of Patent: Jul. 24, 2012

(54) BLOCK MANAGEMENT METHOD FOR FLASH MEMORY, AND FLASH MEMORY CONTROLLER AND FLASH MEMORY STORAGE DEVICE USING THE SAME

(75) Inventors: Hsiang-Hsiung Yu, Hsinchu County (TW); Yi-Hsiang Huang, Hsinchu (TW); Chung-Lin Wu, Taichung (TW); Yu-Chung Shen, Kaohsiung County (TW)

(73) Assignee: Phison Electronics Corp., Miaoli (TW)

( * ) Notice: Subject to any disclaimer, the term of this patent is extended or adjusted under 35 U.S.C. 154(b) by 154 days.

(21) Appl. No.: 12/705,325

(22) Filed: Feb. 12, 2010

(65) Prior Publication Data

US 2011/0145482 A1 Jun. 16, 2011

(30) Foreign Application Priority Data

Dec. 11, 2009 (TW) ................................ 98142542 A (51) Int. Cl.
*G06F 12/14* (2006.01)
(52) U.S. Cl. .................. 711/103; 711/163; 711/E12.091
(58) Field of Classification Search .................. 711/103, 711/163, E12.091
See application file for complete search history.

(56) References Cited

U.S. PATENT DOCUMENTS

2008/0222446 A1* 9/2008 Yasaki et al. ...................... 714/1

FOREIGN PATENT DOCUMENTS

CN 1949194 4/2007

* cited by examiner

*Primary Examiner* — Yong Choe
(74) *Attorney, Agent, or Firm* — J.C. Patents (57) ABSTRACT

A block management method for managing blocks of a flash memory storage device is provided. The flash memory storage device includes a flash memory controller. The block management method includes the following steps. At least a part of the blocks is grouped into a first partition and a second partition. Whether an authentication code exists is determined. When the authentication code exists, the blocks belonging to the first partition are provided for a host system to access, so the host system displays the first partition and hides the second partition. An authentication information is received from the host system. Whether the authentication information and the authentication code are identical is authenticated. When the authentication information and the authentication code are identical, the blocks belonging to the second partition are provided for the host system to access, so the host system displays the second partition and hides the first partition.

25 Claims, 6 Drawing Sheets

BLOCK MANAGEMENT METHOD FOR FLASH MEMORY, AND FLASH MEMORY CONTROLLER AND FLASH MEMORY STORAGE DEVICE USING THE SAME

CROSS-REFERENCE TO RELATED APPLICATION

This application claims the priority benefit of Taiwan application serial no. 98142542, filed on Dec. 11, 2009. The entirety of the above-mentioned patent application is hereby incorporated by reference herein and made a part of this specification.

BACKGROUND OF THE INVENTION

1. Field of the Invention

The invention relates to a block management method for a flash memory, and a flash memory controller and a flash memory storage device using the same.

2. Description of Related Art

With the development of the Universal Series Bus (USB) specification and the widespread popularity of flash memory, a portable flash drive has become one of the most popular digital products. Due to the small storage capacity of a floppy disk and the inconvenience of updating data stored in an optical disc, the floppy disk and the optical disc have declined due to the emergence of the flash drive.

For a computer system that has a transmission interface compatible with the flash drive, it is very convenient to write data into the flash drive or read data from the flash drive, not to mention the drastic improvement in data portability. Thus, more and more users utilize flash drives to store various kinds of data, such that data can be processed in a private computer system or a public computer system.

However, a user may lose his flash drive unknowingly due to the compact size of the flash drive. In particular, the internal structure of the flash drive does not include any identification information. Therefore, even though someone may pick up a lost flash drive, it is difficult to give the lost flash drive back to the owner. Moreover, many people may own flash drives which have the same appearance due to the widespread popularity of flash drives. Thus, it may be difficult to identify the owner of a flash drive. In this situation, important data stored in flash drives may be leaked by people who mistakenly recovered the lost flash drives.

Accordingly, in order to avoid important data stored in flash drives from being leaked, setting an authentication code such as a password is desirable. The user can gain an access right to the flash drive by entering a correct authentication information, such as a correct password, into the flash drive. In order to gain access to the flash drive when the flash drive is connected to a computer system, a program is necessary in the computer system for the user to enter the authentication information.

Therefore, in order to prevent the computer system from failing to access the flash drive due to an absence of the authentication program, the program must be stored in the flash drive in advance. However, if the user does not intend to set the authentication code but the flash drive still displays a slot corresponding to the program, the user may feel that the authentication program is inconvenient and unnecessary.

Nothing herein should be construed as an admission of knowledge in the prior art of any portion of the present invention. Furthermore, citation or identification of any document in this application is not an admission that such document is available as prior art to the present invention, or that any reference forms is a part of the common general knowledge in the art.

SUMMARY OF THE INVENTION

The invention is directed to a block management method capable of providing different blocks for a host system to access according to whether an authentication code is set in a flash memory storage device, thereby making the host system able to automatically switch the slots which are displayed.

The invention is directed to a flash memory controller. According to whether an authentication code is set in a flash memory storage device, the flash memory controller is capable of providing different blocks for a host system to access, thereby making the host system able to automatically switch the slots which are displayed.

The invention is directed to a flash memory storage device. According to whether an authentication code is set in the flash memory storage device, the flash memory storage device is capable of providing different blocks for a host system to access, thereby making the host system able to automatically switch the slots which are displayed.

According to an exemplary embodiment of the invention, a block management method for managing a plurality of blocks of a flash memory storage device is provided. Herein, the flash memory storage device includes a flash memory controller. The block management method includes following steps. At least a part of the blocks is grouped into a first partition and a second partition. Whether an authentication code exists is determined. When the authentication code exists, the blocks belonging to the first partition are provided for a host system to access, such that the host system displays the first partition and hides the second partition. An authentication information is received from the host system, such that whether an authentication code exists is determined. When the authentication information and the authentication code are identical, the blocks belonging to the second partition are provided for the host system to access, such that the host system displays the second partition and hides the first partition.

According to an exemplary embodiment of the invention, the block management method further includes a step of providing the blocks belonging to the second partition for the host system to access when the authentication code does not exist, such that the host system displays the second partition and hides the first partition.

According to an exemplary embodiment of the invention, the block management method further includes a step of not providing the blocks belonging to the second partition for the host system to access when the authentication information and the authentication code are not identical, such that the host system continuously displays the first partition and hides the second partition until the received authentication information and the authentication code are identical.

According to an exemplary embodiment of the invention, before the step of providing the blocks belonging to the first partition for the host system to access, the block management method further includes the following steps. Whether a confirm request is received from the host system is determined. If the confirm request is received from the host system, the blocks belonging to the first partition and the second partition are not provided for the host system to access, such that the host system hides the first partition and the second partition. If the confirm request is not received from the host system, the blocks belonging to the first partition are provided for the host system to access, such that the host system displays the first partition and hides the second partition.

According to an exemplary embodiment of the invention, after the step of not providing the blocks belonging to the first partition and the second partition for the host system to access, the block management method further includes the following steps. The authentication information received from the host system, and whether the authentication information and the authentication code are identical is authenticated. When the authentication information and the authentication code are identical, the blocks belonging to the second partition are provided for the host system to access, such that the host system displays the second partition.

According to an exemplary embodiment of the invention, the block management method further includes a step of not providing the blocks belonging to the first partition and the second partition for the host system to access when the authentication information and the authentication code are not identical, such that the host system continuously hides the first partition and the second partition until the received authentication information and the authentication code are identical.

According to an exemplary embodiment of the invention, in the step of if the confirm request is received from the host system, an operation system of the host system is a first operation system. Herein, the first operation system includes a first program, and the host system transmits the authentication information to the flash memory controller by the first program.

According to an exemplary embodiment of the invention, the flash memory controller includes a second program, and in the step of authenticating whether the authentication information and the authentication code are identical, the authentication information is authenticated by the second program.

According to an exemplary embodiment of the invention, in the step of if the confirm request is not received from the host system, the operation system of the host system is a second operation system. Herein, the second operation system is different from the first operation system.

According to an exemplary embodiment of the invention, a third program is stored in the blocks belonging to the first partition, and in the step of authenticating whether the authentication information and the authentication code are identical, the authentication information is authenticated by the third program.

According to an exemplary embodiment of the invention, the block management method further includes the following steps. Another part of the blocks is grouped into a third partition. The authentication code is stored in the third partition and the third partition is hidden.

According to an exemplary embodiment of the invention, a flash memory controller for managing a plurality of blocks of a flash memory storage device is provided. The flash memory controller includes a microprocessor unit, a storage medium interface unit, a host interface unit, and a storage medium management unit. The storage medium interface unit is coupled to the microprocessor unit and configured to connect with the storage medium. The host interface unit is coupled to the microprocessor unit and configured to connect with a host system. A storage medium management unit is coupled to the microprocessor unit and configured to group at least a part of the blocks into a first partition and a second partition. The storage medium management unit determines whether an authentication code exists. When the authentication code exists, the storage medium management unit provides the blocks belonging to the first partition for a host system to access, such that the host system displays the first partition and hides the second partition. The storage medium management unit receives an authentication information from the host system to authenticate whether the authentication information and the authentication code are identical. When the authentication information and the authentication code are identical, The storage medium management unit provides the blocks belonging to the second partition for the host system to access, such that the host system displays the second partition and hides the first partition.

According to an exemplary embodiment of the invention, before the host system displays the first partition and hides the second partition, the storage medium management unit further determines whether to receive a confirm request from the host system. If receiving the confirm request from the host system, the storage medium management unit does not provide the blocks belonging to the first partition and the second partition for the host system to access, such that the host system hides the first partition and the second partition. If not receiving the confirm request from the host system, the storage medium management unit provides the blocks belonging to the first partition for the host system to access, such that the host system displays the first partition and hides the second partition. If the storage medium management unit receives the confirm request from the host system, an operation system of the host system is a first operation system. Herein, the first operation system includes a first program, and the host system transmits the authentication information to the flash memory controller by the first program. If the storage medium management unit does not receive the confirm request from the host system, the operation system of the host system is a second operation system, wherein the second operation system is different from the first operation system. Herein, a second program is stored in the blocks belonging to the first partition. The storage medium management unit authenticates the authentication information by the second program.

According to an exemplary embodiment of the invention, a flash memory storage device for a host system is provided. The flash memory storage device includes a connector, a storage medium, and a flash memory controller. The connector is configured to connect with the host system. The flash memory controller is coupled to the connector and the storage medium and configured to manage a plurality of blocks of the flash memory storage device. The flash memory controller groups at least a part of the blocks into a first partition and a second partition. The flash memory controller determines whether an authentication code exists. When the authentication code exists, the flash memory controller provides the blocks belonging to the first partition for the host system to access, such that the host system displays the first partition and hides the second partition. The flash memory controller receives an authentication information from the host system and authenticates whether the authentication information and the authentication code are identical. When the authentication information and the authentication code are identical, the flash memory controller provides the blocks belonging to the second partition for the host system to access, such that the host system displays the second partition and hides the first partition.

According to an exemplary embodiment of the invention, before the host system displays the first partition and hides the second partition, the flash memory controller further determines whether to receive a confirm request from the host system. If receiving the confirm request from the host system, the flash memory controller does not provide the blocks belonging to the first partition and the second partition for the host system to access, such that the host system hides the first partition and the second partition. If not receiving the confirm request from the host system, the flash memory controller provides the blocks belonging to the first partition for the host system to access, such that the host system displays the first partition and hides the second partition. After the host system hides the first partition and the second partition, the flash memory controller further receives the authentication information from the host system and authenticates whether the authentication information and the authentication code are identical. When the authentication information and the authentication code are identical, the flash memory controller provides the blocks belonging to the second partition for the host system to access, such that the host system displays the second partition. When the authentication information and the authentication code are not identical, the flash memory controller does not provide the blocks belonging to the first partition and the second partition for the host system to access, such that the host system continuously hides the first partition and the second partition until the received authentication information and the authentication code are identical.

According to an exemplary embodiment of the invention, a block management method for managing a plurality of blocks of a flash memory storage device is provided, wherein the flash memory storage device includes a flash memory controller. The block management method includes the following steps. Whether a confirm request is received from a host system is determined. If the confirm request is received, a first authentication process is performed to authenticate whether an authentication information and an authentication code are identical, wherein an operation system of the host system is a first operation system. If the confirm request is not received, a second authentication process is performed to authenticate whether the authentication information and the authentication code are identical, wherein the operation system of the host system is a second operation system which is different from the first operation system.

According to an exemplary embodiment of the invention, the block management method further includes following steps. At least a part of the blocks is grouped into a first partition and a second partition. Whether an authentication code exists is determined. If the authentication code exists, and the confirm request is received, the first authentication process is performed. When the first authentication process is performed, if the authentication information and the authentication code are identical, the blocks belonging to the second partition are provided for the host system to access, such that the host system displays the second partition. If the authentication code exists, and the confirm request is not received, the second authentication process is performed. When the second authentication process is performed, if the authentication information and the authentication code are identical, the blocks belonging to the second partition are provided for the host system to access, such that the host system displays the second partition and hides the first partition.

According to an exemplary embodiment of the invention, the block management method further includes the following steps. When the authentication code does not exist, the blocks belonging to the second partition are provided for the host system to access, such that the host system displays the second partition and hides the first partition.

According to an exemplary embodiment of the invention, the block management method further includes the following steps. Before the first authentication process is performed, the blocks belonging to the first partition and the second partition are not provided for the host system to access, such that the host system hides the first partition and the second partition.

According to an exemplary embodiment of the invention, the block management method further includes the following steps. When the first authentication process is performed, if the authentication information and the authentication code are not identical, the blocks belonging to the first partition and the second partition are not provided for the host system to access, such that the host system continuously hides the first partition and the second partition.

According to an exemplary embodiment of the invention, the block management method further includes the following steps. When the first authentication process is performed, if the authentication information and the authentication code are not identical, the first authentication process is repeated until the received authentication information and the authentication code are identical.

According to an exemplary embodiment of the invention, in the step of performing the first authentication process, the first authentication process is performed by a first program and a second program. Herein, the first operation system includes the first program, and the flash memory controller includes the second program.

According to an exemplary embodiment of the invention, the block management method further includes the following steps. When the second authentication process is performed, if the authentication information and the authentication code are not identical, the blocks belonging to the second partition are not provided for the host system to access, such that the host system continuously displays the first partition and hides the second partition.

According to an exemplary embodiment of the invention, the block management method further includes the following steps. When the second authentication process is performed, if the authentication information and the authentication code are not identical, the second authentication process is repeated until the received authentication information and the authentication code are identical.

Based on the above, in the exemplary embodiment of the invention, the block management method is used to protect the flash memory storage device by the authentication process. If the user does not set the authentication code in the flash memory storage device, the flash memory storage device can provide suitable blocks for the host system to access. Accordingly, the host system can automatically switch the slots which are displayed so as to make the host system hide the unnecessary slots and programs.

In order to make the aforementioned and other features and advantages of the invention more comprehensible, embodiments accompanying figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1A:
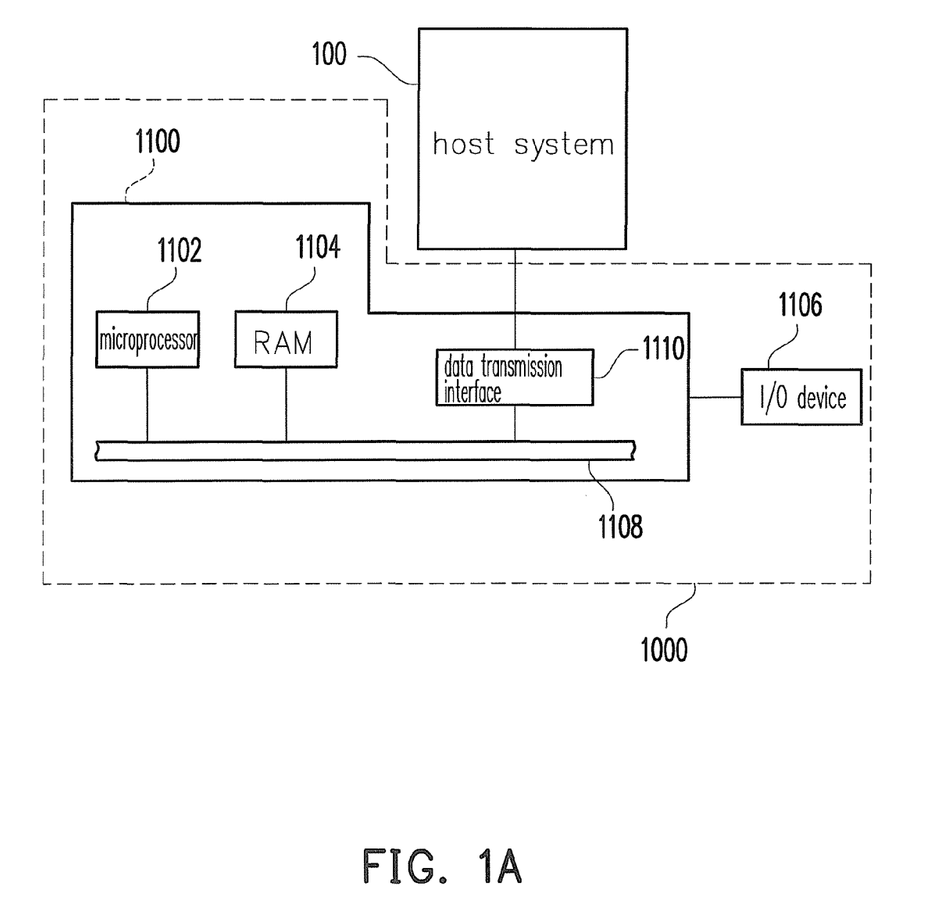
FIG. 1A is a schematic block diagram of a host system using a flash memory storage device according to an exemplary embodiment of the invention.

FIG. 1A is a schematic block diagram of a host system using a flash memory storage device according to an exemplary embodiment of the invention.

Figure 1B:
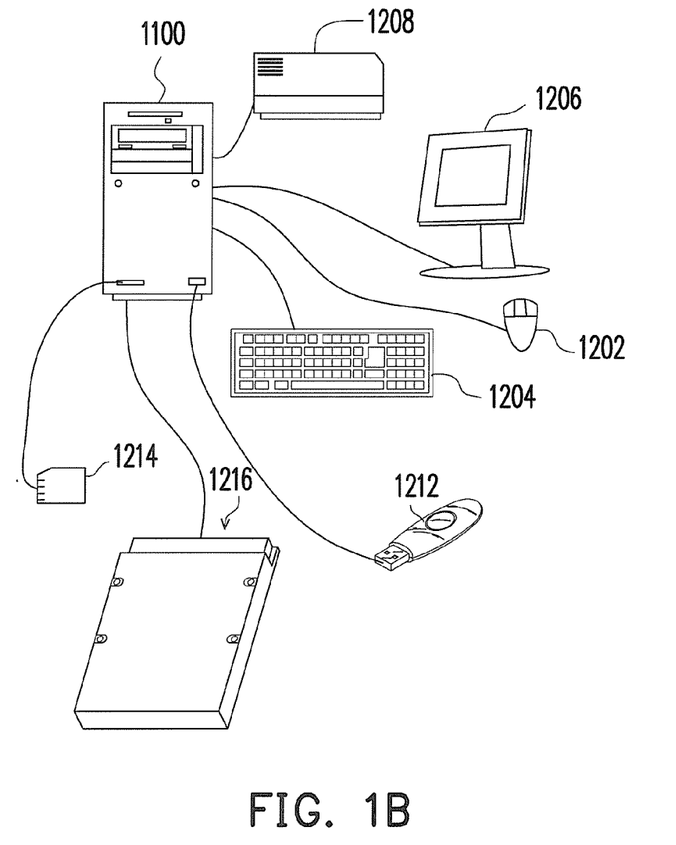
FIG. 1B illustrates a diagram of a computer, an input/output (I/O) device, and a flash memory storage device according to an exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In an embodiment of the invention, the flash memory storage device 100 is coupled to the devices of the host system 1000 through the data transmission interface 1110. By using the microprocessor 1102, the random access memory (RAM) 1104 and the Input/Output (I/O) device 1106, the data can be written into the flash memory storage device 100 or can be read from the flash memory storage device 100. For example, the flash memory storage device 100 may be a flash drive 1212, a memory card 1214, or a solid state drive (SSD) 1216, as shown in FIG. 1B.

Figure 1C:
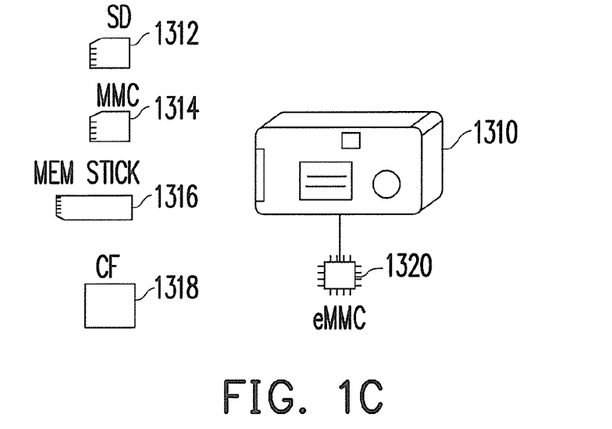
FIG. 1C illustrates a digital camera (video camera) according to an exemplary embodiment of the invention, and the flash memory storage device is a SD card, a MMC card, a CF card, a memory stick, or an embedded storage device.

Generally, the host system 1000 can be substantially any system capable of storing data. Even though the host system 1000 is described as a computer system in the present exemplary embodiment, in another exemplary embodiment of the invention, the host system 1000 may also be a digital camera, a video camera, a communication device, an audio player, a video player, or other suitable systems. For example, if the host system is a digital camera (video camera) 1310, the flash memory storage device may be a SD card 1312, a MMC card 1314, a memory stick 1316, a CF card 1318, or an embedded storage device 1320 (as shown in FIG. 1C). The embedded storage device 1320 includes an embedded MMC (eMMC). It should be mentioned that the eMMC is directly coupled to a substrate of the host system 1000.

Figure 2:
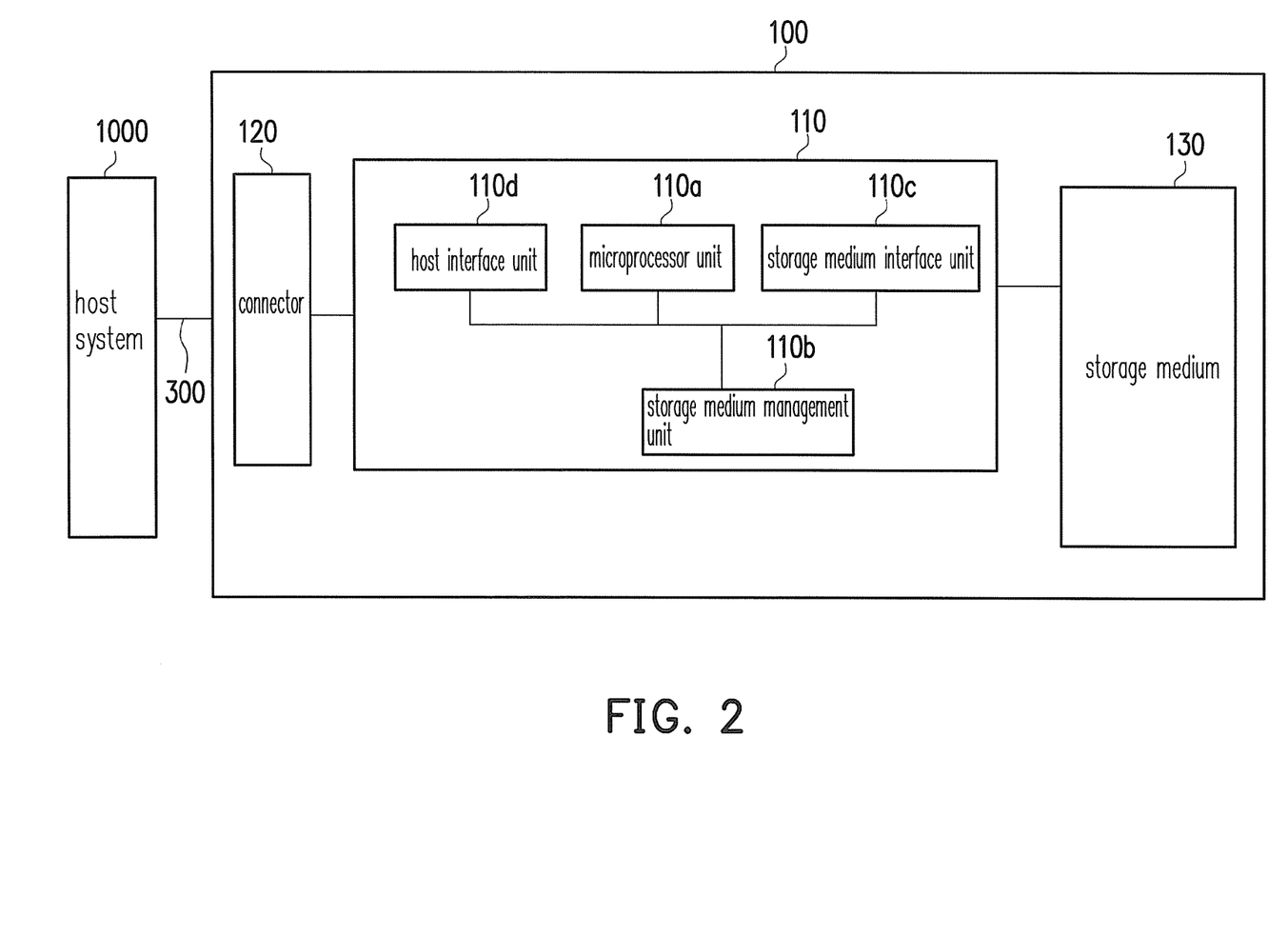
FIG. 2 is a schematic block diagram illustrating a flash memory storage system according to an exemplary embodiment of the invention.

FIG. 2 is a schematic block diagram illustrating a flash memory storage system according to an exemplary embodiment of the invention.

Referring to FIG. 2, a flash memory storage system 100 is usually used together with a host system 1000 for the host system 1000 to write data into the flash memory storage device 100 or to read data from the flash memory storage device 100. In the present embodiment, the flash memory storage device 100 is a flash disk. However, it should be understood that, in another embodiment of the invention, the flash memory storage device 100 may also be a solid state drive (SSD) or a memory card.

The flash memory storage device 100 includes a flash memory controller 110, a connector 120, and a storage medium 130.

The flash memory controller 110 executes a plurality of logic gates or control commands implemented in a hardware manner or a firmware manner and performs various data operations such as data writing, reading, and erasing in the storage medium 130 according to commands of the host system 1000. The flash memory controller 110 includes a microprocessor unit 110a, a storage medium management unit 110b, a storage medium interface unit 110c, and a host interface unit 110d.

The microprocessor unit 110a collaborates with the storage medium management unit 110b, the storage medium interface unit 110c, and the host interface unit 110d for performing every kind of operation of the flash memory storage device 100.

The storage medium management unit 110b is coupled to the microprocessor unit 110a and is configured to perform a block management mechanism and an authentication process according to the present exemplary embodiment.

Specifically, in order to prevent important data stored in flash memory storage device from being leaked, the user usually sets an authentication code, such as a password, in the flash memory storage device. Thus, when the flash memory storage drive 100 is coupled to the host system 1000, if the user enters the correct authentication information, the host system 1000 can accesses the flash memory storage drive 100. It should be noted that the authentication code may be a data which has been processed by the flash memory storage drive 100. For example, the password set by the user may be encrypted by the flash memory storage drive 100 to obtain the data. Furthermore, the authentication information may be a data which has been processed by the host system 1000. For example, the password input by the user may be encrypted by the host system 1000 to obtain the data.

Accordingly, in the present exemplary embodiment, when the flash memory storage drive 100 is coupled to the host system 1000, the host system 1000 determines whether to transmit a confirm request to the flash memory storage drive 100 according to the operation system thereof, so as to perform an authentication process with the storage medium management unit 110b. Besides, the microprocessor unit 110a with the storage medium management unit 110b determines memory blocks which the host system 1000 can access according to whether the authentication code is set in the flash memory storage device 100.

That is, the microprocessor unit 110a provides suitable blocks for the host system 1000 to access according to whether the authentication code exists, such that the host system 1000 can automatically switch the slots which are displayed. The block management mechanism and the authentication process in the present exemplary embodiment will be described in detail below.

In the present exemplary embodiment, the storage medium management unit 110b is implemented as a firmware form in the flash memory controller 110. For example, the storage medium management unit 110b including a plurality of control instructions is burned into a program memory (for example, a read only memory (ROM)), and the program memory is embedded into the flash memory controller 110. When the flash memory storage device 100 is in operation, the control instructions of the storage medium management unit 110b are executed by the microprocessor unit 110a to accomplish the block management mechanism according to the present exemplary embodiment.

In another exemplary embodiment of the invention, the control commands of the storage medium management unit 110b may also be stored in a specific area (for example, a system area, which is used for storing system data only, in the flash memory) of the storage medium 130 as program codes. Similarly, the control commands of the storage medium management unit 110b are executed by the microprocessor unit 110a when the flash memory storage device 100 is in operation. In addition, in another exemplary embodiment of the invention, the storage medium management unit 110b may also be implemented in the flash memory controller 110 in a hardware form.

The storage medium interface unit 110c is coupled to the microprocessor unit 110a and is configured to access the storage medium 130. That is, the data to be written into the storage medium 130 is transformed to a foil rat acceptable to the storage medium 130 by the storage medium interface unit 110c.

The host interface unit 110d is coupled to the microprocessor unit 110a for receiving and identifying the commands sent by the host system 1000. In other words, the commands and data sent by the host system 1000 are transmitted to the microprocessor unit 110a via the host interface unit 110d. However, it should be noticed that the host interface unit 110d of the invention can also be a Serial Advanced Technology Attachment (SATA) interface, a Universal Serial Bus (USB) interface, an Institute of Electrical and Electronic Engineers (IEEE) 1394 interface, a Peripheral Component Interconnect Express (PCI Express) interface, a Memory Stick (MS) interface, a MultiMediaCard (MMC) interface, a CompactFlash (CF) interface, an Integrated Device Electronics (IDE) interface, or other suitable types of interfaces for data transmission.

Moreover, though not shown in the present exemplary embodiment, the flash memory controller 110 also includes an error correction unit and a power management unit for controlling general functionality modules of flash memory.

The connector 120 is coupled to the flash memory controller 110 and is connected to the host system 1000 through a bus 300. However, it should be noticed that the connector 120 can also be a SATA connector, a USB connector, an IEEE 1394 connector, a PCI Express connector, an MS connector, an MMC connector, a CF connector, an IDE connector, or other suitable connectors.

The storage medium 130 is coupled to the flash memory controller 110 and used to store the application program for the authentication process and the data stored by the user.

Figure 3:
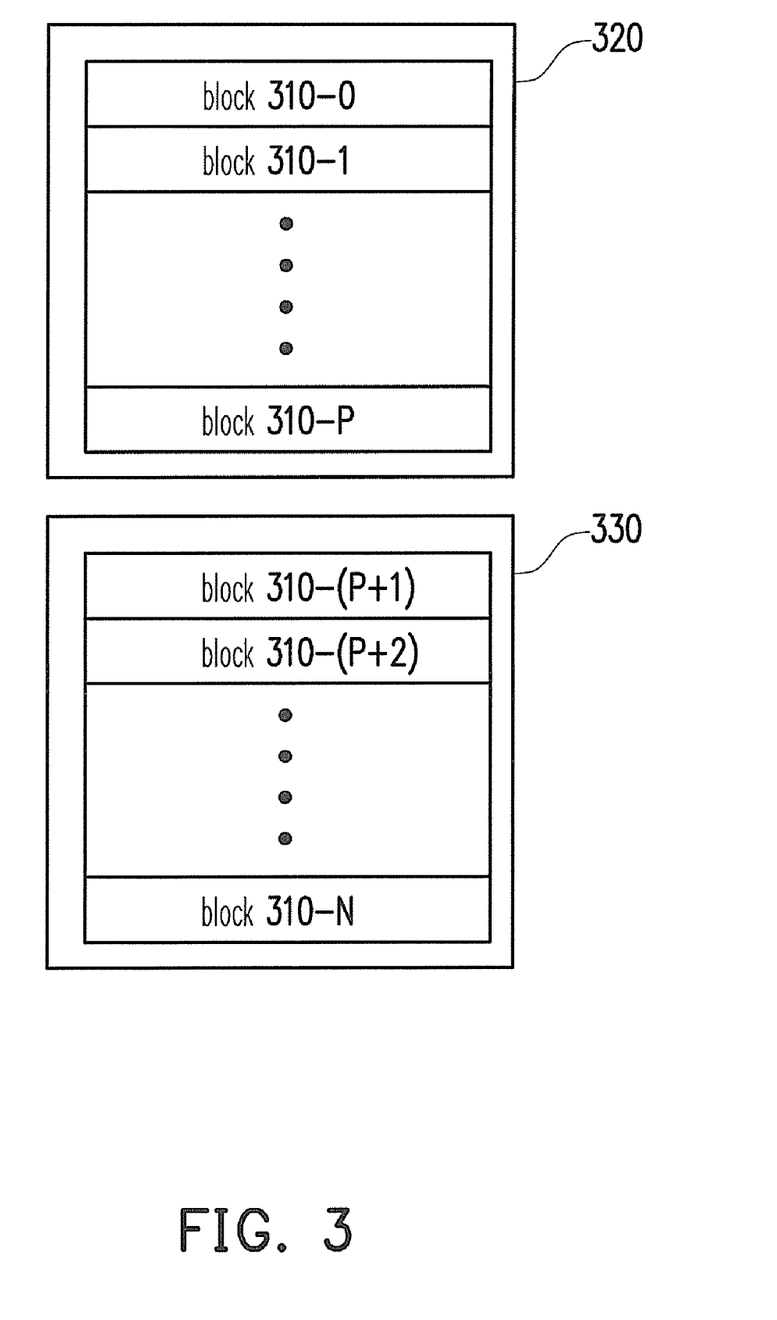
FIG. 3 is a schematic diagram illustrating the storage medium according to an exemplary embodiment of the invention.

FIG. 3 is a schematic diagram illustrating the storage medium according to an exemplary embodiment of the invention.

Referring to FIG. 3, the storage medium 130 includes blocks 310-0 . . . 310-N. In the present exemplary embodiment, the storage medium management unit 110b groups the blocks 310-0 . . . 310-N into a first partition 320 and a second partition 330, wherein the first partition 320 includes the blocks 310-0 . . . 310-P, and the second partition 330 includes the blocks 310-(P+1) . . . 310-N. The aforementioned P and M are positive integers which represent a number of the blocks allocated in each area.

In the present exemplary embodiment, the blocks 310-0 . . . 310-P belonging to the first partition 320 is configured to store the application program for the user to enter the authentication information. While being executed, the application program is provided for the user to enter the authentication information, such that the host system can access the user's data stored in the second partition 330. The number of the blocks 310-(P+1) . . . 310-N belonging to the second partition 330 represents a storage capacity which is provided for the user, and it may be more than the number of blocks belonging to the first partition 320.

In the present exemplary embodiment, when the flash memory storage drive 100 is coupled to the host system 1000, the microprocessor unit 110a can determine memory blocks which the host system 1000 can access according to whether the authentication code exists in the flash memory storage drive 100.

Herein, the authentication code is, for example, set by the user when the flash memory storage drive 100 is first used, in order to prevent important data stored in the second partition 330 from being leaked. In the present exemplary embodiment, the authentication code is not limited to be set when the flash memory storage drive 100 is first used, and it may be set when the flash memory storage drive 100 is used any time.

Specifically, if the host system 1000 uses an operation system, e.g. WINDOWS 7, when the flash memory storage drive 100 is coupled to the host system 1000, the host system 1000 enables the flash memory storage drive 100. At this time, the storage medium management unit 110b determines whether an authentication code exists in the flash memory storage drive 100.

If the authentication code exists, the operation system WINDOWS 7 transmits a confirm request to confirm whether the flash memory storage drive 100 supports a standard protocol.

If the flash memory storage drive 100 supports the standard protocol, the host system 1000 performs an authentication on input information with the storage medium management unit 110b. Herein, the above standard protocol is, for example, the IEEE 1667 standard protocol published by the Institute of Electrical and Electronic Engineers (IEEE) or other protocols in which the host performs an active authentication, but the invention is not limited thereto.

Accordingly, when the flash memory storage drive 100 is coupled to the host system 1000, the operation system WINDOWS 7 transmits the confirm request to ask the flash memory controller 110 to answer whether it supports the IEEE 1667 standard protocol. If the flash memory controller 110 answers that it supports the IEEE 1667 standard protocol, the host system 1000 performs the authentication on the input information with the microprocessor unit 110a.

That is, the host system 1000 performs an operation on an authentication information input by the user by a first program of the operation system WINDOWS 7. Next, the host system 1000 transmits the operation result to the storage medium management unit 110b to perform the authentication. Thereafter, the flash memory storage drive 100 performs an operation on an authentication code stored therein by a second program of the storage medium management unit 110b. Similarly, the storage medium management unit 110b transmits the operation result to the host system 1000 to perform the authentication with each other. Accordingly, in the present exemplary embodiment, the above authentication process can be defined as a first authentication process. Furthermore, in another exemplary embodiment, the second program may be stored in the storage medium 103.

That is, in the present exemplary embodiment, when the flash memory storage drive 100 is coupled to the host system 1000 which uses the operation system WINDOWS 7, the storage medium management unit 110b performs the first authentication process with the host system 1000.

When the above authentication result is correct, it represents that the authentication information is the same as the authentication code. Accordingly, the storage medium management unit 110b provides the blocks 310-(P+1) . . . 310-N of the second partition 330 for the host system 1000 to access, and further, the host system 1000 simply displays the slot corresponding to the second partition 330 on the screen (not shown).

It should be noted that, in the present exemplary embodiment, when the flash memory storage drive 100 is coupled to the host system 1000, the operation system WINDOWS 7 must first confirm whether the flash memory storage drive 100 supports the IEEE 1667 standard protocol, and before the first authentication process has not been finished, the flash memory storage drive 100 may not provide a system information of the first partition 320 and the second partition 330. Herein, the system information may include the capability of the partitions and a file allocation table. Accordingly, at this time, the host system 1000 does not display the slots corresponding to the first partition 320 and the second partition 330.

Furthermore, in the present exemplary embodiment, the storage medium management unit 110b performs the authentication process with the host system 1000 by the second program. In another exemplary embodiment, the second program may be stored in the specific blocks of the storage medium 130 and provided for the microprocessor unit 110a to perform the authentication process.

Accordingly, when the operation system is WINDOWS 7, if the authentication code exists, the user can input the same authentication information as the authentication code by the first program, such that the host system 1000 can access the blocks 310-(P+1) . . . 310-N of the second partition 330. Moreover, before the user inputs the authentication information, the host system 1000 does not display the slots corresponding to the first partition 320 and the second partition 330 on the screen thereof. Furthermore, when the user inputs the authentication information, and the authentication information can pass the first authentication process, the host system 1000 simply displays the slot corresponding to the second partition 330 on the screen.

On the contrary, if the authentication code does not exist, the host system 1000 directly displays the slot corresponding to the second partition 330 on the screen and hides the slot corresponding to the first partition 320. Accordingly, the user unnecessarily inputs the authentication information, and the host system 1000 can access the blocks 310-(P+1) . . . 310-N.

That is, when the authentication code does not exist, no matter whether the flash memory storage drive 100 supports the IEEE 1667 standard protocol, the host system 1000 unnecessarily passes the authentication and can access the blocks 310-(P+1) . . . 310-N of the second partition 330, thereby directly displaying the second partition 330.

In another exemplary embodiment of the invention, if the host system 1000 uses an operation system, e.g. WINDOWS XP, when the flash memory storage drive 100 is coupled to the host system 1000, the operation system WINDOWS XP does not transmit a confirm request to confirm whether the flash memory controller 110 supports the IEEE 1667 standard protocol.

Specifically, when the flash memory storage drive 100 is coupled to the host system 1000, the host system 1000 enables the flash memory storage drive 100. At this time, the storage medium management unit 110b determines whether an authentication code exists in the flash memory storage drive 100. If the storage medium management unit 110b determines that the authentication code exists and does not receive the confirm request from the host system 1000, the storage medium management unit 110b provides the blocks 310-0 . . . 310-P of the first partition 320 to allow the host system 1000 to access the data stored in the blocks 310-0 . . . 310-P. Accordingly, the user can input authentication information to perform the authentication by a third program.

In other words, in the present exemplary embodiment, the operation system WINDOWS XP does not transmit the confirm request to ask the storage medium management unit 110b of the flash memory controller 110 to answer whether it supports the IEEE 1667 standard protocol. Therefore, if the authentication code exists, when not receiving the confirm request, the microprocessor unit 110a provides the blocks 310-0 . . . 310-P of the first partition 320 for the host system 1000 to access, such that the host system 1000 displays the first partition 320 and hides the second partition 330. Herein, the microprocessor unit 110a may, for example, provide system information of the first partition 320 for the host system 1000, such that the host system 1000 displays the first partition 320 for the user to use. Herein, the above third program, for example, is stored in the blocks belonging to the first partition 320. Accordingly, the user can input the authentication information to perform the authentication by the third program. In the present exemplary embodiment, the above authentication process can be defined as a second authentication process.

Next, the storage medium management unit 110b performs the second authentication process with the host system 1000 by the third program stored in the blocks of the first partition 320. That is, at this time, the storage medium management unit 110b receives the authentication information from the host system 1000 and authenticates whether the authentication information and the authentication code are identical. If the authentication information and the authentication code are identical, the storage medium management unit 110b responds with a media change message to the host system 1000 to switch the partition which the host system 1000 displays, and further, the storage medium management unit 110b provides the blocks 310-(P+1) . . . 310-N of the second partition 330 for the host system 1000 to access.

For example, if the system information of the first partition 320 is stored in the block 310-0, and the system information of the second partition 330 is stored in the block 310-(P+1), when the authentication information input by the user is correct after authentication, the storage medium management unit 110b receives a next request from the host system 1000, and accordingly, responds with the media change message to the host system 1000. Next, the host system 1000 asks the storage medium management unit 110b to transmit the system information again, and the host system 1000 reads the data from the block 310-0. Thereafter, the storage medium management unit 110b transmits the system information of the second partition 330 stored in the block 310-(P+1) to the host system 1000. Accordingly, the host system 1000 can obtain the system information of the second partition 330 so as to switch the partition which it displays.

Therefore, after switching the displayed partition, the host system 1000 displays the second partition 330 and hides the first partition 320, thereby displaying the slot corresponding to the second partition 330 on the screen and hides the slot corresponding to the first partition 320.

On the contrary, if the authentication information and the authentication code are not identical, the storage medium management unit 110b simply provides the blocks 310-0~310-P of the first partition 320 for the host system 1000 to access. Until the authentication information input by user is the same as the preset authentication code, the host system 1000 can simply access the data stored in the blocks 310-(P+1) . . . 310-N of the second partition 330. That is, if the authentication information and the authentication code are not identical, the host system 1000 simply displays the first partition 320 and hides the second partition 330.

Furthermore, if the authentication code does not exist, the storage medium management unit 110b provides the blocks 310-(P+1) . . . 310-N of the second partition 330 for the host system 1000 to access. Accordingly, the host system 1000 hides the first partition 320 on the screen and simply displays the slot corresponding to the second partition 330. That is, if the authentication code is not set in the flash memory storage drive 100, the second authentication process is unnecessary, and the host system 1000 can directly access the user's data stored in the blocks 310-(P+1) . . . 310-N of the second partition 330.

As aforementioned, if the user does not set the authentication code in the flash memory storage drive 100, the storage medium management unit 110b provides the blocks 310-(P+1) . . . 310-N of the second partition 330 for the host system 1000 to access but does not provide the blocks 310-0 . . . 310-P of the first partition 320. That is, the storage medium management unit 110b makes the host system 1000 able to automatically switch the slots which are displayed, such that the host system does not display the unnecessary slot and the third program.

As known from the above exemplary embodiments, the storage medium management unit 110b determines whether to receive the confirm request according to the different operation systems, and further determines to perform the first authentication process or the second authentication process.

Figure 5:
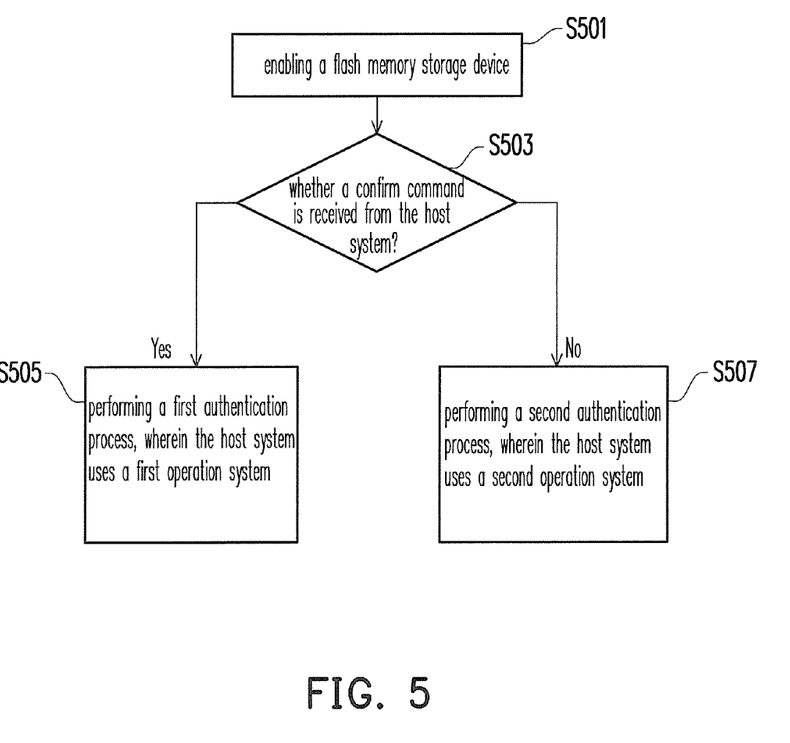
FIG. 5 is a flowchart illustrating a block management method according to another exemplary embodiment of the invention.

Referring to FIG. 5, for example, in steps S501-S503, when the flash memory storage drive 100 is coupled to the host system 1000 and is enabled, the storage medium management unit 110b determines whether to receive a confirm request. If the flash memory storage drive 100 is coupled to the host system 1000 using a first operation system, e.g. WINDOWS 7, the storage medium management unit 110b receives the confirm request from the host system 1000. Accordingly, the flash memory storage drive 100 and the host system 1000 perform the first authentication process with the first and the second programs, as in step S505.

On the contrary, when the flash memory storage drive 100 is coupled to the host system 1000 using a second operation system, e.g. WINDOWS XP, the storage medium management unit 110b does not receive the confirm request from the host system 1000. Accordingly, the flash memory storage drive 100 performs the second authentication process with the third program, as in step S507.

In the present exemplary embodiment, the authentication code is, for example, stored in an Electrically Erasable Programmable Read Only Memory (EEPROM, not shown) of the flash memory storage device 100. Besides the storage medium management unit 110b grouping the blocks 310-0 . . . 310-N into the first partition 320 and the second partition 330 in the present exemplary embodiment, the storage medium management unit 110b may group the blocks 310-0 . . . 310-N into the first partition 320, the second partition 330, and the third partition (not shown) in other exemplary embodiments, wherein the third partition includes many blocks to store the authentication code set by the user. Herein, when the flash memory storage drive 100 is coupled to the host system 1000, the host system 1000 does not display the third partition.

In other exemplary embodiments, the flash memory storage drive 100 may further include another application program, by which the user can choose whether to make the flash memory storage drive 100 support the IEEE 1667 standard protocol, in order to prevent a public partition from being unusable due to an authentication failure.

Figure 4:
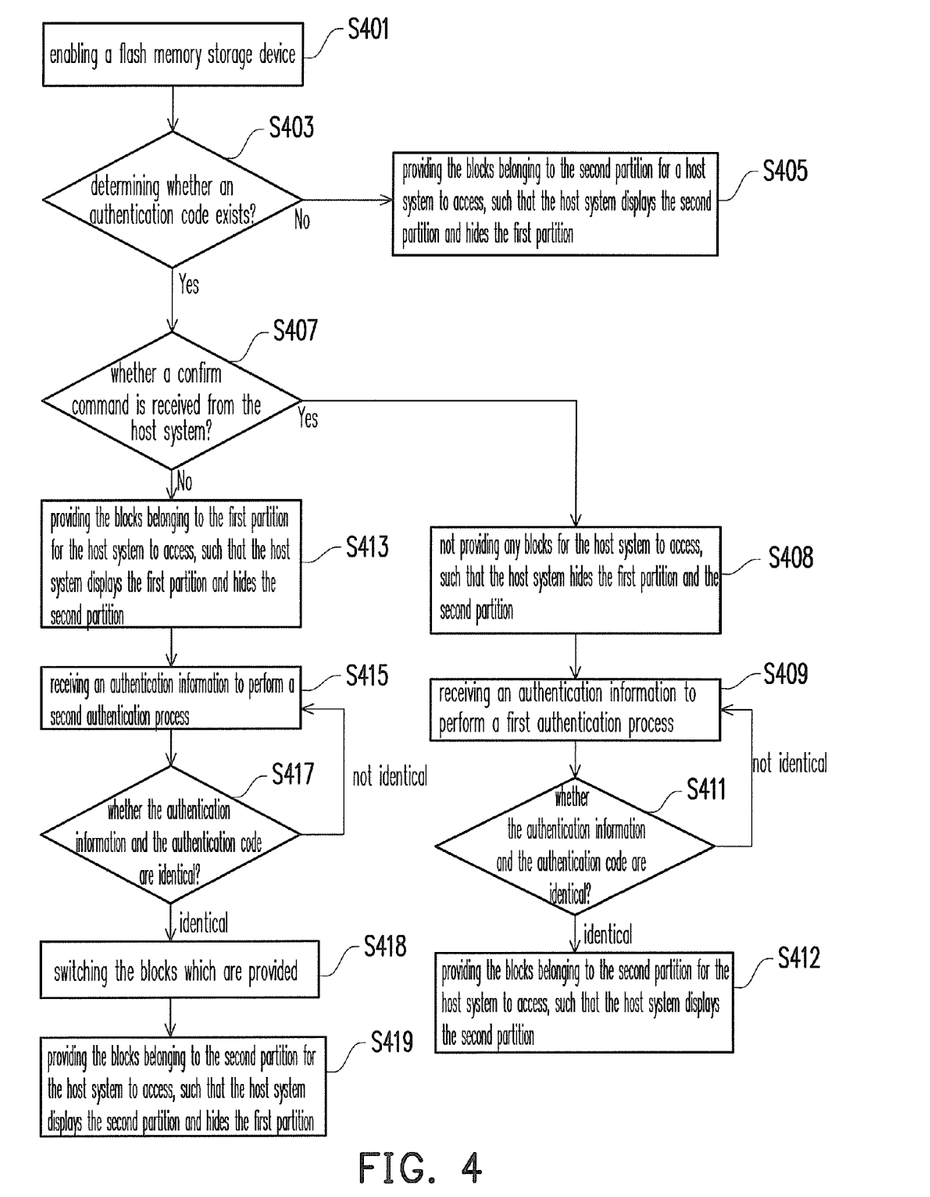
FIG. 4 is a flowchart illustrating a block management method according to an exemplary embodiment of the invention.

FIG. 4 is a flowchart illustrating a block management method according to an exemplary embodiment of the invention.

Referring to FIGS. 2-4, in step S401, the flash memory storage drive 100 is enabled. For example, the flash memory storage drive 100 is coupled to the host system 1000.

Next, in step S403, the storage medium management unit determines whether an authentication code exists.

If not, in step S405, the storage medium management unit provides the blocks 310-(P+1) . . . 310-N belonging to the second partition 330 for the host system 1000 to access, such that the host system 1000 displays the second partition 330 and hides the first partition 320. Accordingly, the first and the second authentication processes are unnecessary, and the host system 1000 can directly access the data stored in the blocks 310-(P+1) . . . 310-N of the second partition 330.

On the contrary, if the storage medium management unit 110b determines that the authentication code exists, step S407 is performed.

In step S407, if the host system 1000 uses the operation system WINDOWS 7, the storage medium management unit 110b receives the confirm request form the host system 1000. At this time, the storage medium management unit 110b does not display the slots corresponding to the first partition 320 and the second partition 330, as shown in step S408.

Next, in step S409, the storage medium management unit 110b receives the authentication information from the host system 1000 to authenticate whether the authentication information and the authentication code are identical, i.e. the first authentication process, as shown in step S411.

If the authentication information and the authentication code are identical, in step S412, the storage medium management unit provides the blocks 310-(P+1) . . . 310-N belonging to the second partition 330 for the host system 1000 to access, such that the host system 1000 displays the second partition 330. Accordingly, the host system 1000 can access the data stored in the blocks 310-(P+1) . . . 310-N.

If the authentication information and the authentication code are not identical, returning to step S409, the storage medium management unit 110b asks the host system 1000 to transmit the authentication information again to perform the first authentication process. That is, if the authentication information and the authentication code are not identical, the storage medium management unit 110b does not provide the first partition 320 and the second partition 330 for the host system 1000 to access. Until the authentication information input by user is the same as the preset authentication code, the host system 1000 can simply access the data stored in the blocks 310-(P+1) . . . 310-N.

In step S407, if the host system 1000 uses the operation system WINDOWS XP, the storage medium management unit 110b does not receive the confirm request form the host system 1000.

Accordingly, in step S413, the storage medium management unit provides the blocks 310-0~310-P belonging to the first partition 320 for the host system 1000 to access, such that the host system 1000 displays the first partition 330 and hides the second partition 330. Accordingly, the user can execute the third program in the host system 1000 to perform the second authentication process. Herein, the above third program, for example, is stored in the blocks belonging to the first partition 320.

Next, in step S415, the second authentication process is performed by the third program. Accordingly, after receiving the authentication information, the storage medium management unit 110b authenticates whether the authentication information and the authentication code are identical, as shown in step S417.

If the authentication information and the authentication code are not identical, returning to step S415, the storage medium management unit 110b asks the host system 1000 to transmit the authentication information again to perform the second authentication process. That is, if the authentication information and the authentication code are not identical, the storage medium management unit 110b does not provide the blocks 310-(P+1) . . . 310-N of the second partition 330 for the host system 1000 to access, such that the host system 1000 continuously displays the blocks 310-0 . . . 310-P of the first partition 320. Until the authentication information input by user is the same as the preset authentication code, the host system 1000 can simply access the data stored in the blocks 310-(P+1) . . . 310-N of the second partition 330.

In step S417, if the authentication information and the authentication code are identical, step S418 is performed. In step S418, the storage medium management unit 110b responds with a media change message to the host system 1000 to switch the partition which the host system 1000 displays.

After the switch has been finished, the storage medium management unit 110b provides the blocks 310-(P+1) . . . 310-N belonging to the second partition 330 for the host system 1000 to access, such that the host system 1000 displays the second partition 330 and hides the first partition 320, and further displays the slot corresponding to the second partition 330 on the screen, as shown in step S419.

Based on the above, the block management method provided in the exemplary embodiment of the invention is adapted to protect the flash memory storage device for storing data by the authentication process. If the user does not set an authentication code in the flash memory storage device, the flash memory storage device is capable of providing suitable blocks for the host system to access, thereby making the host system able to automatically switch the slots which are displayed. Alternatively, in the block management method provided in the exemplary embodiment of the invention, the flash memory storage device is adapted to provide different authentication processes according to different operation systems which the host system uses.

The previously described exemplary embodiments of the present invention have many advantages, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A block management method for managing a plurality of blocks of a flash memory storage device, wherein the flash memory storage device comprises a flash memory controller, the block management method comprising:
   grouping at least a part of the blocks into a first partition and a second partition;
   determining whether an authentication code exists;
   when the authentication code exists, providing the blocks belonging to the first partition for a host system to access, such that the host system displays the first partition and hides the second partition;
   receiving an authentication information from the host system;
   authenticating whether the authentication information and the authentication code are identical; and
   when the authentication information and the authentication code are identical, providing the blocks belonging to the second partition for the host system to access, such that the host system displays the second partition and hides the first partition.

2. The block management method as claimed in claim 1, further comprising:
   when the authentication code does not exist, providing the blocks belonging to the second partition for the host system to access, such that the host system displays the second partition and hides the first partition.

3. The block management method as claimed in claim 2, further comprising:
   when the authentication information and the authentication code are not identical, not providing the blocks belonging to the second partition for the host system to access, such that the host system continuously displays the first partition and hides the second partition until the received authentication information and the authentication code are identical.

4. The block management method as claimed in claim 1, wherein before the step of providing the blocks belonging to the first partition for the host system to access, the block management method further comprises:
   determining whether a confirm request is received from the host system;
   if the confirm request is received from the host system, not providing the blocks belonging to the first partition and the second partition for the host system to access, such that the host system hides the first partition and the second partition; and
   if the confirm request is not received from the host system, providing the blocks belonging to the first partition for the host system to access, such that the host system displays the first partition and hides the second partition.

5. The block management method as claimed in claim 4, wherein after the step of not providing the blocks belonging to the first partition and the second partition for the host system to access, the block management method further comprises:

receiving the authentication information from the host system;

authenticating whether the authentication information and the authentication code are identical; and when the authentication information and the authentication code are identical, providing the blocks belonging to the second partition for the host system to access, such that the host system displays the second partition.

6. The block management method as claimed in claim 5, further comprising:

when the authentication information and the authentication code are not identical, not providing the blocks belonging to the first partition and the second partition for the host system to access, such that the host system continuously hides the first partition and the second partition until the received authentication information and the authentication code are identical.

7. The block management method as claimed in claim 4, wherein in the step of if the confirm request is received from the host system, an operation system of the host system is a first operation system, wherein the first operation system comprises a first program, and the host system transmits the authentication information to the flash memory controller by the first program.

8. The block management method as claimed in claim 7, wherein the flash memory controller comprises a second program, and in the step of authenticating whether the authentication information and the authentication code are identical, the authentication information is authenticated by the second program.

9. The block management method as claimed in claim 7, wherein in the step of if the confirm request is not received from the host system, the operation system of the host system is a second operation system, wherein the second operation system is different from the first operation system.

10. The block management method as claimed in claim 9, wherein a third program is stored in the blocks belonging to the first partition, and in the step of authenticating whether the authentication information and the authentication code are identical, the authentication information is authenticated by the third program.

11. The block management method as claimed in claim 1, further comprising:

grouping another part of the blocks into a third partition;

storing the authentication code into the third partition; and hiding the third partition.

12. A flash memory controller for managing a plurality of blocks of a flash memory storage device, the flash memory controller comprising:

a microprocessor unit;

a storage medium interface unit coupled to the microprocessor unit and configured to connect with a storage medium;

a host interface unit coupled to the microprocessor unit and configured to connect with a host system; and a storage medium management unit coupled to the microprocessor unit and configured to group at least a part of the blocks into a first partition and a second partition, the storage medium management unit determining whether an authentication code exists, when the authentication code exists, the storage medium management unit providing the blocks belonging to the first partition for a host system to access, such that the host system displays the first partition and hides the second partition, the storage medium management unit receiving an authentication information from the host system, the storage medium management unit authenticating whether the authentication information and the authentication code are identical, and when the authentication information and the authentication code are identical, the storage medium management unit providing the blocks belonging to the second partition for the host system to access, such that the host system displays the second partition and hides the first partition.

13. The flash memory controller as claimed in claim 12, wherein before the host system displays the first partition and hides the second partition, the storage medium management unit further determines whether to receive a confirm request from the host system, if receiving the confirm request from the host system, the storage medium management unit does not provide the blocks belonging to the first partition and the second partition for the host system to access, such that the host system hides the first partition and the second partition, if not receiving the confirm request from the host system, the storage medium management unit provides the blocks belonging to the first partition for the host system to access, such that the host system displays the first partition and hides the second partition, if the storage medium management unit receives the confirm request from the host system, an operation system of the host system is a first operation system, wherein the first operation system comprises a first program, and the host system transmits the authentication information to the flash memory controller by the first program, if the storage medium management unit does not receive the confirm request from the host system, the operation system of the host system is a second operation system, wherein the second operation system is different from the first operation system, and a second program is stored in the blocks belonging to the first partition, the storage medium management unit authenticates the authentication information by the second program.

14. A flash memory storage device for a host system, the flash memory storage device comprising:

a connector configured to connect with the host system;

a storage medium; and a flash memory controller coupled to the connector and the storage medium and configured to manage a plurality of blocks of the flash memory storage device, the flash memory controller grouping at least a part of the blocks into a first partition and a second partition, the flash memory controller determining whether an authentication code exists, when the authentication code exists, the flash memory controller providing the blocks belonging to the first partition for the host system to access, such that the host system displays the first partition and hides the second partition, the flash memory controller receiving an authentication information from the host system and authenticating whether the authentication information and the authentication code are identical, and when the authentication information and the authentication code are identical, the flash memory controller providing the blocks belonging to the second partition for the host system to access, such that the host system displays the second partition and hides the first partition.

15. The flash memory storage device as claimed in claim 14, wherein before the host system displays the first partition and hides the second partition, the flash memory controller further determines whether to receive a confirm request from the host system, if receiving the confirm request from the host system, the flash memory controller does not provide the blocks belonging to the first partition and the second partition for the host system to access, such that the host system hides the first partition and the second partition, if not receiving the confirm request from the host system, the flash memory controller provides the blocks belonging to the first partition for the host system to access, such that the host system displays the first partition and hides the second partition, after the host system hides the first partition and the second partition, the flash memory controller further receives the authentication information from the host system and authenticates whether the authentication information and the authentication code are identical, when the authentication information and the authentication code are identical, the flash memory controller provides the blocks belonging to the second partition for the host system to access, such that the host system displays the second partition, and when the authentication information and the authentication code are not identical, the flash memory controller does not provide the blocks belonging to the first partition and the second partition for the host system to access, such that the host system continuously hides the first partition and the second partition until the received authentication information and the authentication code are identical.

16. A block management method for managing a plurality of blocks of a flash memory storage device, wherein the flash memory storage device comprises a flash memory controller, the block management method comprising:
  determining whether a confirm request is received from a host system, wherein the confirm request is used to confirm whether the flash memory device supports a standard protocol in which the host system performs an active authentication;
  if the confirm request is received, performing a first authentication process to authenticate whether an authentication information and an authentication code are identical, wherein an operation system of the host system is a first operation system; and
  if the confirm request is not received, performing a second authentication process to authenticate whether the authentication information and the authentication code are identical, wherein the operation system of the host system is a second operation system which is different from the first operation system.

17. The block management method as claimed in claim 16, further comprising:
  grouping at least a part of the blocks into a first partition and a second partition; and
  determining whether the authentication code exists, wherein if the confirm request is received, the step of performing the first authentication process comprises:
  if the authentication code exists and the confirm request is received, performing the first authentication process; and
  when the first authentication process is performed, if the authentication information and the authentication code are identical, providing the blocks belonging to the second partition for the host system to access, such that the host system displays the second partition.

18. The block management method as claimed in claim 17, wherein if the confirm request is not received, the step of performing the second authentication process comprises:
  if the authentication code exists and the confirm request is not received, performing the second authentication process; and
  when the second authentication process is performed, if the authentication information and the authentication code are identical, providing the blocks belonging to the second partition for the host system to access, such that the host system displays the second partition and hides the first partition.

19. The block management method as claimed in claim 18, further comprising:
  when the authentication code does not exist, providing the blocks belonging to the second partition for the host system to access, such that the host system displays the second partition and hides the first partition.

20. The block management method as claimed in claim 18, further comprising:
  when the second authentication process is performed, if the authentication information and the authentication code are not identical, not providing the blocks belonging to the second partition for the host system to access, such that the host system continuously displays the first partition and hides the second partition.

21. The block management method as claimed in claim 20, further comprising:
  when the second authentication process is performed, if the authentication information and the authentication code are not identical, repeating the second authentication process until the received authentication information and the authentication code are identical.

22. The block management method as claimed in claim 17, further comprising:
  before the first authentication process is performed, not providing the blocks belonging to the first partition and the second partition for the host system to access, such that the host system hides the first partition and the second partition.

23. The block management method as claimed in claim 17, further comprising:
  when the first authentication process is performed, if the authentication information and the authentication code are not identical, not providing the blocks belonging to the first partition and the second partition for the host system to access, such that the host system continuously hides the first partition and the second partition.

24. The block management method as claimed in claim 23, further comprising:
  when the first authentication process is performed, if the authentication information and the authentication code are not identical, repeating the first authentication process until the received authentication information and the authentication code are identical.

25. The block management method as claimed in claim 23, wherein in the step of performing the first authentication process, the first authentication process is performed by a first program and a second program, wherein the first operation system comprises the first program, and the flash memory controller comprises the second program.

* * * * *